United States Patent [19]

Hutter et al.

[11] Patent Number: 4,651,438

[45] Date of Patent: Mar. 24, 1987

[54] ECCENTRICITY MEASURING APPARATUS

[75] Inventors: Karl Hutter; Jacob Wagner, both of VS-Muhlhausen, Fed. Rep. of Germany

[73] Assignee: Hommelwerke GmbH, Fed. Rep. of Germany

[21] Appl. No.: 844,787

[22] Filed: Mar. 27, 1986

[30] Foreign Application Priority Data

Mar. 27, 1985 [DE] Fed. Rep. of Germany ....... 3511564

[51] Int. Cl.[4] ............................................. G01B 7/28
[52] U.S. Cl. ..................................... 33/550; 33/178 D
[58] Field of Search ......... 33/550, 517, 556, DIG. 18, 33/DIG. 17, DIG. 21, 180 AT, 181 AT, 178 D, 551

[56] References Cited

U.S. PATENT DOCUMENTS

| | | | |
|---|---|---|---|
| 2,896,331 | 7/1959 | Horst | 33/178 D |
| 3,305,932 | 2/1967 | Iselin | 33/178 D |
| 3,321,869 | 5/1967 | Parrella et al. | 33/550 |
| 3,371,419 | 3/1968 | Banks et al. | 33/550 |
| 3,468,034 | 9/1969 | Blinder | 33/550 |
| 3,604,248 | 9/1971 | Altmann | 33/550 |
| 4,215,482 | 8/1980 | Szewczyk | 33/178 D |
| 4,351,115 | 9/1982 | Possati | 33/178 D |
| 4,578,869 | 4/1986 | O'Brien | 33/550 |

Primary Examiner—Willis Little
Attorney, Agent, or Firm—Allegretti, Newitt, Witcoff & McAndrews, Ltd.

[57] ABSTRACT

In an apparatus for measuring the eccentricity of an eccentric bearing face having an axis of rotation, a rotary motion and a perimeter, the apparatus comprises a length measurement gauge, mounting means for mounting the length measurement gauge, means for guiding the movement of the length measurement gauge, in which the guiding means comprises a follower and two bearing tips, and means for applying the bearing tips to the eccentric bearing face. The mounting means for mounting the length measurement gauge functions to (a) maintain the length measurement gauge in the radical direction during rotary motion, and (b) enable the length measurement gauge to move perpendicularly to the axis of rotation. The guiding means functions to guide the movement of the length measurement gauge in the direction of the rotary motion of the eccentric bearing face. The guiding means comprises a follower, which is able to move radially with respect to the bearing face, and two bearing tips at a distance to one another along the perimeter of the eccentric bearing face. The follower is coupled to the length measurement gauge in the direction of its movement perpendicular to the axis of rotation.

11 Claims, 4 Drawing Figures

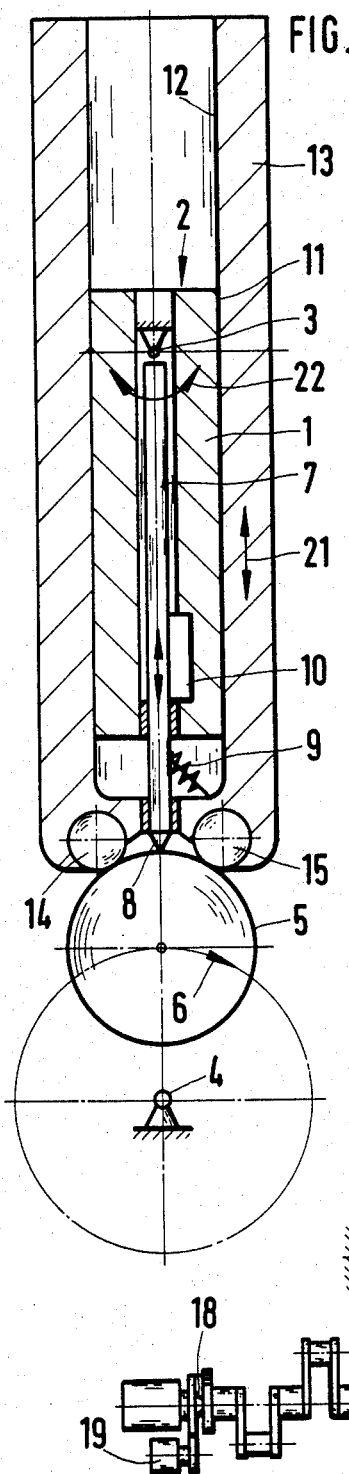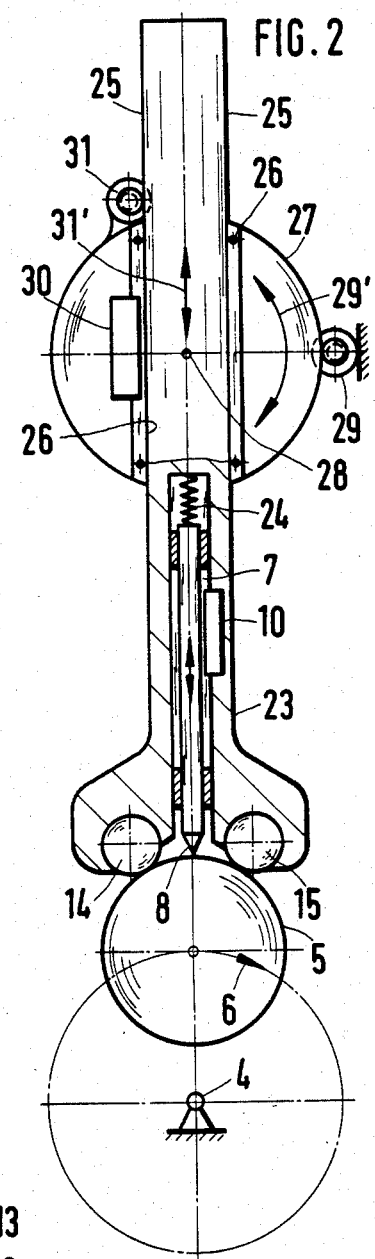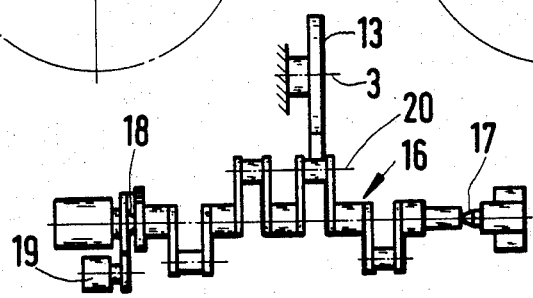

ECCENTRICITY MEASURING APPARATUS

BACKGROUND OF THE INVENTION

The present invention relates to an improved apparatus for measuring the eccentricity of eccentric bearing faces, and more particularly, connecting rod bearing faces.

A prior device for measuring the eccentricity of eccentric bearing faces is disclosed in German Disclosure Document DE-OS No. 31 47 424. In this device, a length measurement gauge is retained in a slide which allows lateral movement of the length measurement gauge. A drive arrangement laterally guides the slide and gauge, and moves sinusoidally. The amplitude and phasing of this motion are adjustable with respect to the rotary position of the eccentric bearing face. A problem associated with this apparatus is that the arrangement that generates the control function is complex and extremely difficult to adjust. A residual error always subsists, and is compounded with the measured radial dimensions and thus the measured eccentricity of a bearing face.

Other apparatus for measuring the out-of-round of eccentric bearing faces are disclosed in brochures of the Adcole Corporation of Waltham, Mass. concerning the Adcole Model 910, 1200 and 1300. These apparatus employ a measuring rule at the end of a measurement cam which bears tangentially on the eccentric bearing face to be measured. The point of contact migrates backward and forward as the crankshaft rotates. A disadvantage of these apparatus is that the measuring rule must be long relative to the eccentricity of the bearing face to be measured. The measuring rule must also be perfectly straight and perfectly perpendicular to the direction of measurement. As a result, these apparatus are very costly and complex to maintain. Measurements contain residual error, because the conditions of perfect accuracy can never be met. Another disadvantage of the Adcole apparatus is that the measuring rule suffers wear as a result of friction.

SUMMARY OF THE INVENTION

The present invention comprises apparatus for the measurement of the eccentricity of eccentric bearing faces, in particular of connecting rod bearings.

A purpose of the present invention is to provide an apparatus of the stated type, in which the disadvantages of known devices are avoided, which is simple to construct and to use, and in which errors are not caused as a result of wear.

A fundamental concept of this invention is that instead of a rule which is brought to bear tangentially, a spot measurement technique is employed, whereby a follower is used to provide the necessary sensing function from the measurement site of the eccentricity of the part to be measured. This follower is directly brought to bear on the eccentric bearing face. Thus, guidance is provided by the measured eccentric bearing face itself and not by a complex guidance arrangement with external following, as is the case with traditional means.

In first and second embodiments of the invention, lateral mobility of a length measurement gauge is provided by means of a fixed hinge bearing. This bearing allows movement of the eccentric to be followed. Radial measurement is performed relative to this bearing. A level of guidance accuracy is achieved which causes bearing error to be negligible.

In a third embodiment of the invention, lateral mobility is provided by alternate means. In this embodiment of the present invention, correction factors to allow for a tilting movement of the measurement arrangement do not have to be taken into account. The direction of measurement is the same and is always parallel to the plane of movement of the eccentric bearing face. In the context of this embodiment of the invention, a length measurement gauge is stated to be any type of device with which the measurement movement can be carried out radially whereas the guidance function is performed tangentially. If a particularly high level of accuracy is required of this embodiment the guidance error is determined by the use of special means, whereby the appropriate correction factors can be introduced in the results of the measurement. Such special means as optical error measurement is particularly suitable. Such means operate with the help of laser beams and sensors which determine any excursion of the beam with respect to the sensors and generate the appropriate electric correction signals.

BRIEF DESCRIPTION OF THE DRAWINGS

In the detailed description which follows, reference will be made to the accompanying drawing comprised of the following figures:

FIG. 1 is a schematic and cross-sectional view of a first embodiment of the present invention, with the section taken perpendicular to the rotary axis of the bearing face to be measured;

FIG. 2 is a small-scale view of the embodiment of FIG. 1 as in use;

FIG. 3 is a view similar to FIG. 1 of a second preferred embodiment of the invention.

DETAILED DESCRIPTION OF THE PREFERRED EMBODIMENT

Figure 4:
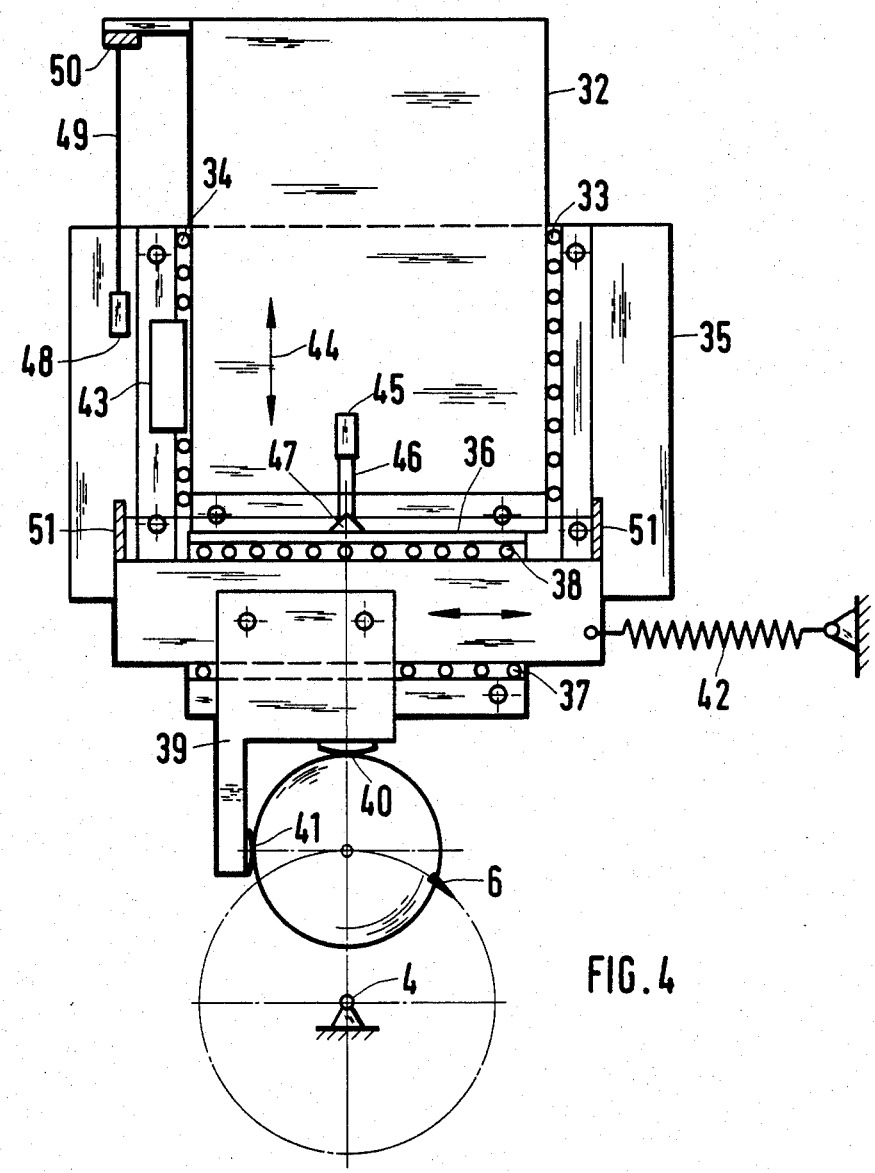
FIG. 4 is a view of a third preferred embodiment of the invention also taken perpendicular to the rotary axis of the bearing face to be measured.

As shown in FIG. 1, a first preferred embodiment has a housing 1 of a length measurement gauge 2. The housing 1 is retained in a fixed, high precision hinge bearing 3 so as to be able to tilt. As shown, the rotary axis of the gauge 2 about bearing 3 is parallel to the axis 4 of a rotary bearing about which a bearing face 5 can rotate in the direction of the arrow 6. The bearing face 5 may be of the type suitable for the connecting rod of a crankshaft, for example.

A tappet 7 is supported in the housing 1 so as to be able to move linearly, whereby the tip 8 of the tappet 7 bears directly on the eccentric cylindrical bearing face 5. A spring 9 maintains contact between the tip 8 of the tappet 7 and the bearing face 5. The tappet 7 operates in concert with an electromechanical transducer 10 which provides an electric alternating current signal proportional to the excursion of the tappet 7.

The external surface of the housing 1 comprises an external guidance face 11 which, together with an internal guidance face 12 of a follower 13, provides a means of linear guidance. Thus, the follower 13 can be easily moved in the direction of the double arrow 2. Rollers 14 and 15 are located at the lower end of the follower 13, equidistant from the measurement tip 8. The rollers 14, 15 are in contact with the bearing face 5, such that the follower 13 bears against the bearing face 5.

FIG. 2 provides a small scale general view of the embodiment shown in FIG. 1 during measurement of a connecting rod bearing. A crankshaft 16 is retained between measurement tips 17 and 18, and can be turned by means of a motor 19. The follower 13 bears on the eccentric bearing face of the connecting rod bearing. The axis of the hinge bearing 3 of the gauge 2 is parallel to the axis of the rotary bearing 4.

During measurement, the crankshaft 16 and its eccentric bearing face 5 are slowly rotated about the axis of the rotary bearing 4 by means of the motor 19, so that the central axis 20 of the bearing face 5 travels around the axis of the rotary bearing 4 in the direction of the arrow 6 (FIG. 1). The rollers 14, 15 of the follower 13 move under the weight of the follower 13 in the direction of the double arrow 21. The rollers 14, 15 are maintained in constant contact with the bearing face 5, so that the follower 13 is continuously moved sideways around the hinge bearing 3. The length measurement gauge 2 tilts as the follower 13 is moved.

The tappet 7 measures the radial dimensions of the bearing face 5 with respect to the hinge bearing 3. The electromechanical transducer 10 provides means for recording the dimensions of the bearing face 5, thus allowing the circular characteristics of the bearing face 5 to be analyzed.

FIG. 3 shows a view to FIG. 1 corresponding of a second preferred embodiment similar to that shown in FIG. 1. This embodiment is not provided with a housing 1 according to FIG. 1. The electromechanical transducer 10 is accommodated directly inside the follower 23 into which the tappet 7 is slidably placed. A spring 24 spring-loads the tappet 7 in the direction of measurement.

The follower 23 is provided with external guide faces 25. The guide faces 25 are guided and maintained between the internal guide faces 26 so as to be able to move linearly. The internal guide faces 26 are located on a disk 27, which is supported so as to be able to tilt about a tilting axis 28 in the direction of the double arrow 29'. The angular position of the disk 27 is detected by an angular sensor 29.

An electromechanical transducer 30 is located at the disk 27, and detects the movement of the follower 23 in the direction of the double arrow 31'. The transducer 30 generates a corresponding electric output signal. The transducer 30 may be used to actuate a motor 31, especially if the follower is oriented to lie in the horizontal plane. The motor 31 may be used to press the rollers 14, 15 against the bearing face 5.

During measurement of the bearing face 5, the pressure exerted by the rollers 14, 15 causes lateral excursion and guidance of the sensor tip 8. The tip 8 also moves relative to the follower 23 so that the electromechanical transducer 10 generates a corresponding output signal. This output signal is influenced by the points at which the rollers 14, 15 come to bear on the bearing face 5. Thus, the signal is indirectly affected by the eccentricity of the bearing face 5. However, the radial points of contact of the rollers 14, 15 are determined by the electromechanical transducer 30 which provides a corresponding output signal. The output signal of the transducer 30 is combined with the output of the electromechanical transducer 10 to provide a sum which corresponds to the distance of the measurement tip 8 from the axis 28. The advantage of the embodiment according to FIG. 3 lies in the fact that it requires only minimal excursions of the tappet 7 which may thus be correspondingly sensitive to allow it to be able to detect even fine amounts of eccentricity.

In the embodiment illustrated in FIG. 4, a follower 32 is guided and maintained by a fixed part 35 by linear guides 33 and 34 At a sensing tip 36 of the follower 32, two linear guides 37 and 38 are provided for a measurement or mobile gauging part 39. The measurement part 39 together with its measurement rule 40 comes to bear on the bearing face 5. A guide rule 41 is maintained laterally against the bearing face 5 by means of a draw spring 42.

An electromechanical transducer 43 is located on the fixed part 35 and senses movement of the follower 32 in the direction of the double arrow 44. The transducer 43 provides an electric signal which corresponds to the movement of the measurement rule 40.

A laser 45 is connected to the follower 32. A beam 46 from the laser 45 impinges over a prism 47 on positional locating detectors 51 on the follower 32. The positional detectors 51 are fastened to the measurement part 39 and provide signals which correspond to the compliance errors in the guides 37 and 38.

A second laser 48 is mounted on the fixed part 35. A beam 49 from the second laser 48 impinges on a positional detector 50 which provides a signal corresponding to movements of the follower 32 resulting from compliance errors in the guides 33 and 34. Thus, the output signals from the detectors 51 and 50 can thus be used to correct the measured radial dimensions so that the entire signal is error-free.

What is claimed is:

1. An apparatus for measuring the eccentricity of an eccentric bearing face, the eccentric bearing face having an axis of rotation, a rotary motion and a perimeter, the apparatus comprising:

a length measurement gauge directed radially to the eccentric bearing face in a radial direction;

mounting means for (a) maintaining the length measurement gauge in the radial direction during rotary motion, and (b) providing for movement of the length measurement gauge perpendicularly to the axis of rotation; and means for guiding the movement of the length measurement gauge in the direction of the rotary motion of the eccentric bearing face, said guiding means comprising a follower movable radially with respect to the eccentric bearing face, two bearing tips at a distance to one another along the perimeter of the eccentric bearing face; and means for applying the bearing tips to the eccentric bearing face;

whereby the follower is coupled to the length measurement gauge in the direction of its movement perpendicular to the axis of rotation.

2. An apparatus according to claim 1 in which the mounting means comprises a hinge bearing remote from the axis of rotation providing rotation of the length measurement gauge parallel to the axis of rotation of the eccentric bearing face, in which the radial direction is a direction of measurement and in which a linear guide couples the length measurement gauge and the follower, the linear guide being parallel to the direction of measurement.

3. An apparatus according to claim 1, wherein the means for applying the bearing tips to the eccentric bearing face comprises a spring.

4. An apparatus according to claim 1, wherein the means for applying the bearing tips to the eccentric bearing face comprises a motor.

5. An apparatus according to claim 2, having the linear guide oriented vertically, such that the weight of the follower bears on the bearing face to be measured.

6. An apparatus according to claim 1, in which the bearing tips comprise rollers, said rollers having axes of rotation, said axes of rotation each being parallel to the axis of rotation of the bearing face to be measured.

7. An apparatus according to claim 1, having the length measurement gauge located inside of the follower.

8. An apparatus according to claim 1, having the length measurement gauge connected to the follower, and also having a linear guide, said follower being retained in said linear guide, said follower being slidably mounted in the linear guide and being movable in the direction of measurement, a hinge bearing having a tilt axis, said tilt axis being parallel to the axis of rotation of the bearing to be measured, said linear guide being pivotally mounted on said hinged bearing, and a second length measurement gauge operatively associated with the follower so as to detect the movement of the follower relative to the hinge bearing.

9. An apparatus according to claim 1, wherein the follower comprises the length measurement gauge having a mobile tappet, said mobile tappet having a linear guide at one end, said linear guide being perpendicular to the direction of measurement, said linear guide being perpendicular to the axis of rotation of the eccentric bearing face, mobile gauging part having the bearing tips, being supported by said linear guide, one of said bearing tips being a measurement tip of said length measurement gauge.

10. An apparatus according to claim 9, having measuring means for measuring error of lateral and tilting movements of the linear guides.

11. An apparatus according to claim 10, wherein the means of error measurement includes a laser and photosensor located at the guide, the beam of the laser being directed to the photosensors, whereby as soon as the spot cast by the beam of the laser migrates to the photosensors a corrective signal is generated.

* * * * *